United States Patent
Song et al.

(10) Patent No.: US 9,591,109 B2
(45) Date of Patent: Mar. 7, 2017

(54) MOBILE TERMINAL

(71) Applicant: LG ELECTRONICS INC., Seoul (KR)

(72) Inventors: Insu Song, Seoul (KR); Jaewook Lee, Seoul (KR); Wooyong Kwon, Seoul (KR); Seyong Kim, Seoul (KR); Minho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 14/662,533

(22) Filed: Mar. 19, 2015

(65) Prior Publication Data

US 2016/0094693 A1    Mar. 31, 2016

(30) Foreign Application Priority Data

Sep. 25, 2014  (KR) .................. 10-2014-0128131

(51) Int. Cl.
*H04M 1/00* (2006.01)
*H04M 1/02* (2006.01)

(52) U.S. Cl.
CPC ....... *H04M 1/0208* (2013.01); *H04M 1/0268* (2013.01)

(58) Field of Classification Search
CPC .................................. H04M 1/0208
USPC .................................... 455/575.1
See application file for complete search history.

(56) References Cited

U.S. PATENT DOCUMENTS

| 2007/0199177 | A1* | 8/2007 | Roberts | H04M 1/0237 16/266 |
| 2009/0079664 | A1* | 3/2009 | Nagai | G02F 1/13336 345/1.3 |
| 2010/0328860 | A1* | 12/2010 | Kim | H04M 1/0216 361/679.01 |
| 2013/0102365 | A1* | 4/2013 | Oh | H04M 1/04 455/566 |
| 2014/0126121 | A1* | 5/2014 | Griffin | H04M 1/0216 361/679.01 |
| 2015/0366089 | A1* | 12/2015 | Park | G06F 1/1652 361/679.01 |

FOREIGN PATENT DOCUMENTS

KR   1020140070813   *  6/2014

* cited by examiner

*Primary Examiner* — Timothy Pham
(74) *Attorney, Agent, or Firm* — KED & Associates LLP

(57) ABSTRACT

There is disclosed a mobile terminal including a curvedly flexible display unit, a case having a case to which the display unit is coupled, wherein the case includes a first case, a second case coupled to the first case to rotate with respect to the first case in a preset range of angles, a hinge shaft provided in the first case, a hinge housing provided in the second case, the hinge housing in which the hinge shaft is disposed, with a cylindrical shape, and a stopper for adjusting a rotation angle between the first case and the second case. The curvature of the mobile terminal may be variable and that it may be convenient to hand-carry the mobile terminal. In addition, the user can change the curvature he or she can feel comfortable. Even when a force is applied to an end of the mobile terminal, the damage on the mobile terminal can be prevented.

11 Claims, 14 Drawing Sheets

(a)      (b)

MOBILE TERMINAL

CROSS-REFERENCE TO RELATED APPLICATION

This application claims priority under 35 U.S.C. §119 to Korean Application No. 10-2014-0128131 filed on Sep. 25, 2014, whose entire disclosure is hereby incorporated by reference.

BACKGROUND

1. Field

Embodiments of the present disclosure relates to a mobile terminal having a variable curvature.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As the functions as the multimedia are considered very important, a mobile terminal with a large screen having a large display and an 8 inch or more tablet is released. In case a screen is enlarged, demands for a curved display are increasing to enhance immersion. It is inconvenient for a user to hand-carry such a curved mobile terminal. When an end of the curved mobile terminal is pressed, the curved mobile terminal might be damaged disadvantageously.

SUMMARY OF THE DISCLOSURE

An object of the present disclosure is to provide a mobile terminal with a variable curvature which can be adjusted. To achieve these objects and other advantages and in accordance with the purpose of the disclosure, as embodied and broadly described herein.

Embodiments of the present disclosure may provide a mobile terminal including a curvedly flexible display unit; a case having a case to which the display unit is coupled, wherein the case includes a first case; a second case coupled to the first case to rotate with respect to the first case in a preset range of angles; a hinge shaft provided in the first case; a hinge housing provided in the second case, the hinge housing in which the hinge shaft is disposed, with a cylindrical shape; and a stopper for adjusting a rotation angle between the first case and the second case.

The stopper may include a first stopper for restricting a rotation angle toward a front surface; and a second stopper for restricting a rotation angle toward a rear surface.

The stopper may include an angle restricting groove formed in a boarder surface of the first case; and a stopping projection projected from the second case, with facing the angle restricting groove, to be inserted in the angle restricting groove, and the stopping projection may include a taper-shaped stopping projection getting smaller than the angle restricting groove toward an end.

The mobile terminal may further include a guide projection formed in a lateral surface of the stopping projection; and a guide groove formed in a lateral surface of the angle restricting groove provided in the second case, corresponding to the guide projection, wherein a plurality of guide projections and a plurality of guide grooves are formed along a longitudinal direction of the case, and the guide projections are stopped by an end of the guide groove near the first case from one of the guide projections near the first case.

The stopper may include an angle restricting groove formed in a boarder surface of the first case; and a stopper projection projected from the second case, with facing the groove, to be inserted in the angle restricting groove, and the angle restricting groove may have a step stepped from a boarder surface between the first case and the second case and an inclined surface formed in an opposite portion of the step.

The stopping projection may be stopped by a predetermined portion of the angle restricting groove to restrict a rotation angle of the first case and the second case.

The mobile terminal may further include a hinge shaft formed in the first case, with a cylindrical shape; and a hinge housing formed in the second case to accommodate the hinge shaft, with a cylindrical shape, and the stopper may include a stopping projection projected from a rotation surface of the hinge shaft; and an angle restricting groove inserted in an inner surface of the hinge housing as deep as or deeper than the projection height of the projection, corresponding to the stopping projection.

A boarder surface between the first case and the second case may include a curved surface with respect to the hinge shaft.

The boarder surface may have a projection or is formed of a material having a large friction coefficient.

The first case may include a first front case provided in a rear surface of the display unit; a first rear case coupled to a rear surface of the first front case; and a screw for coupling the first front case and the second front case to each other, and the hinge housing may be formed by coupling the first front case and the first rear case to each other, and the screw may be coupled to a portion adjacent to the first hinge housing.

10. The mobile terminal may further include a first tape for bonding the first case and the display unit to each other; and a second tape for bonding the second case and the display to each other, wherein the first tape and the second tape are spaced apart a preset distance from a border area between the first case and the second case.

The mobile terminal may further include a third case rotatably coupled to the second case, wherein the first case is coupled to a predetermined portion of the second case and the third case is coupled to the other portion of the second case.

A main board may be mounted in the first case and a battery is mounted in the second case.

A connection hole may be formed in the first case and the second case, and a flexible board may be provided to connect the main board to the battery through the connection hole.

The flexible display unit may be an organic light emitting diode (OLED).

In at least one embodiment of the present disclosure, the curvature of the mobile terminal may be variable and it is convenient to hand-carry the mobile terminal. In addition, the user can change the curvature he or she can feel comfortable. Even when a force is applied to an end of the mobile terminal, the damage on the mobile terminal can be prevented.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
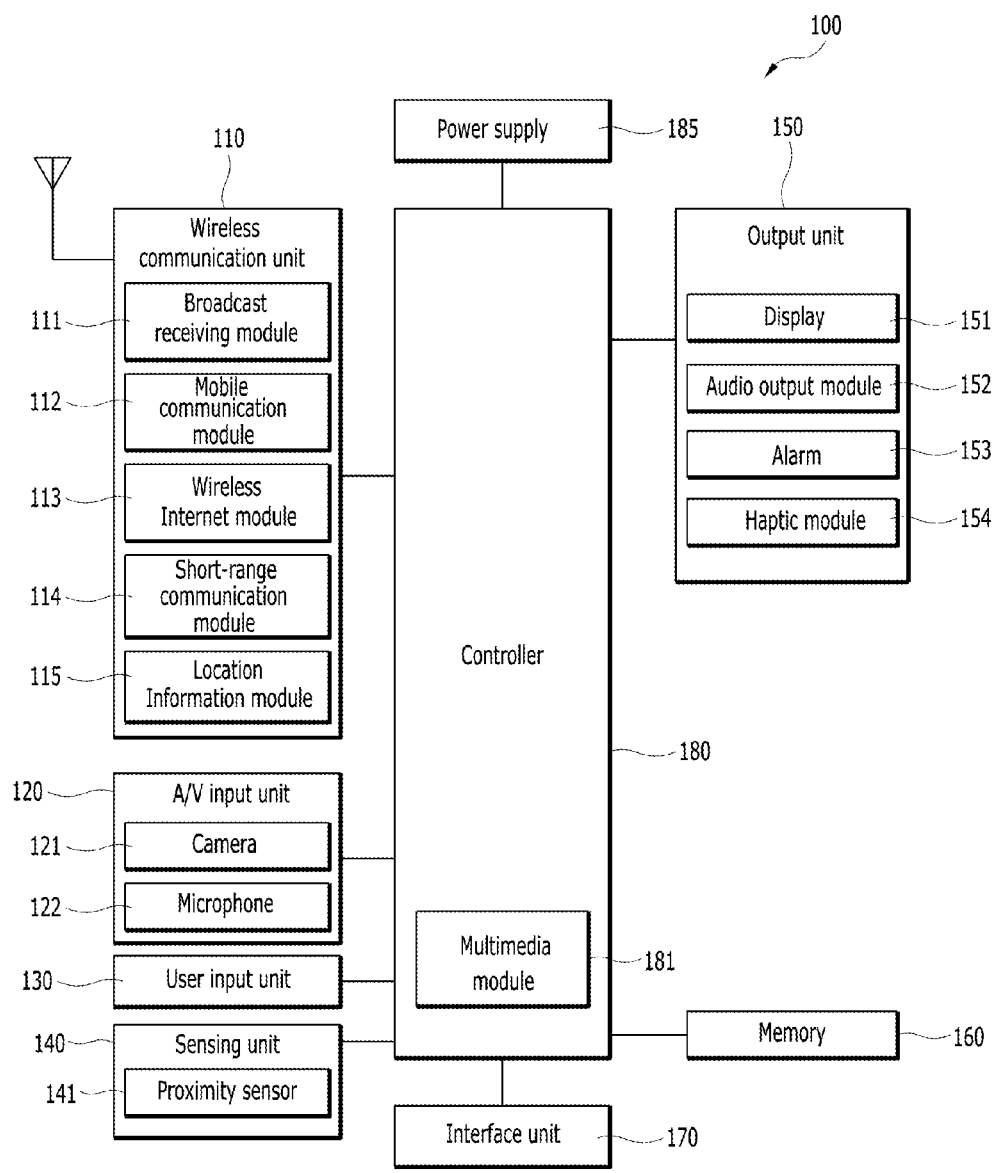
FIG. 1 is a block diagram of a mobile terminal in accordance with the present disclosure.

Reference is now made to FIG. 1, where FIG. 1A is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components mentioned above may be operated cooperatively to embody an operation, control or a control method of the mobile terminal in accordance with various embodiments which will be described hereinafter. The operation, control or control method of the mobile terminal may be realized on the mobile terminal by driving of at least one application program stored in the memory 170.

Figure 2:
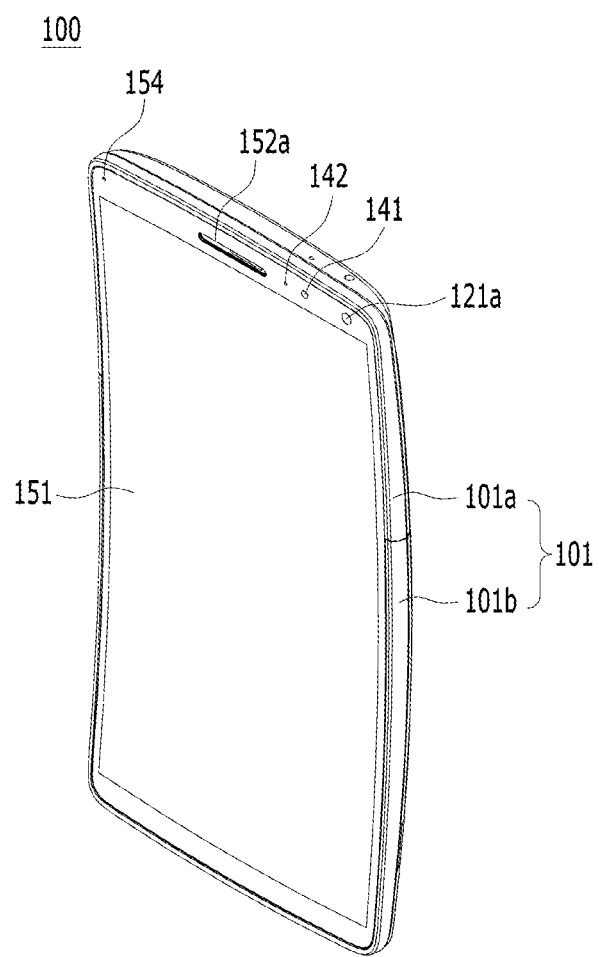
FIG. 2 is conceptual view of one example of the mobile terminal, viewed from one directions.
Figure 3:
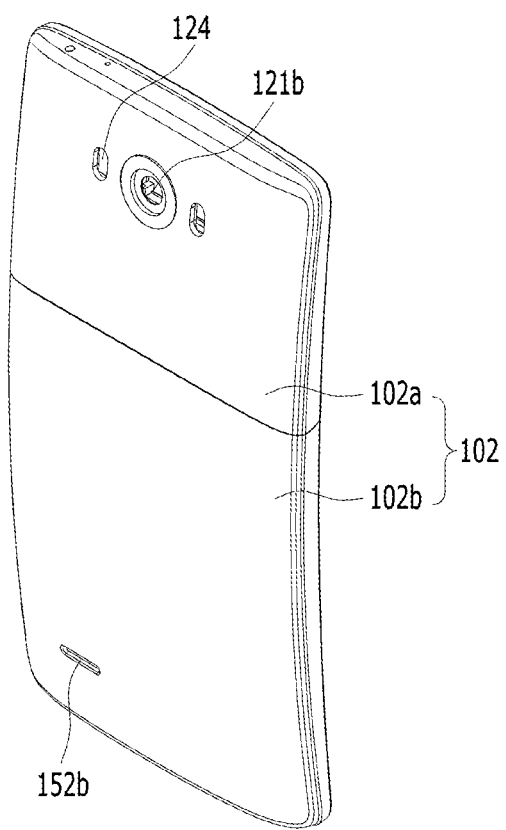
FIG. 3 is conceptual view of one example of the mobile terminal, viewed from another directions.

FIG. 2 is a front perspective diagram illustrating one embodiment of the mobile terminal in accordance with the present disclosure. FIG. 3 is a rear perspective diagram illustrating one embodiment of the mobile terminal in accordance with the present disclosure.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

The mobile terminal 100 in accordance with the present disclosure includes a curved surface. In the drawings, it is shown that a central area of the mobile terminal 100 is convexly curved toward a rear direction and that upper and lower ends are projected toward a forward direction.

To provide a curved display 151 unit, the mobile terminal case may be formed in a curved shape corresponding to the curved surface of the display unit 151. In this instance, the curved mobile terminal is inconvenient to hand-carry. If both ends of such the curved mobile terminal are pressed, with putting the mobile terminal being put on a flat floor, there might be damage on the mobile terminal.

Figure 4:
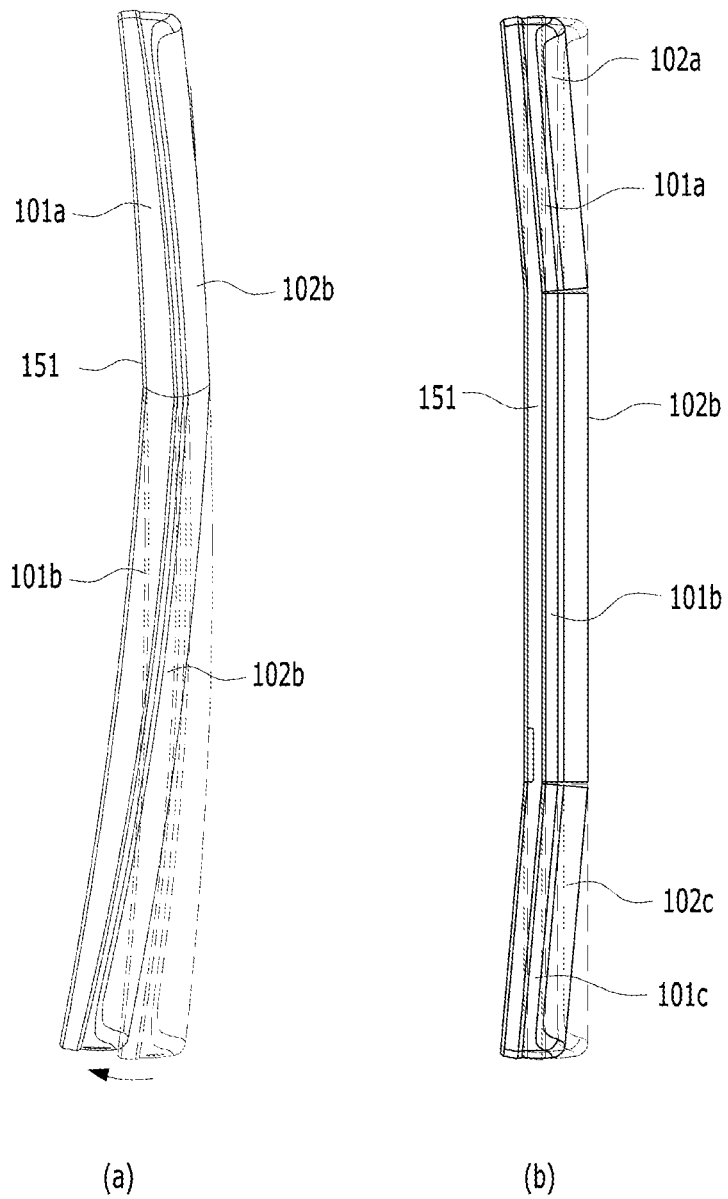
FIG. 4 is a side view illustrating one embodiment of the mobile terminal in accordance with the present disclosure.

To solve such disadvantage, the case of the mobile terminal in accordance with the present disclosure may be partitioned off into two cases. The two cases are coupled to each other by a hinge and angles of the two cases may be adjusted, such that a curvature of the mobile terminal can be varied. FIG. 4 is a side view illustrating one embodiment of the mobile terminal in accordance with the present disclosure. The case may be divided into a first case 101a and 102a and a second case 101b and 102b. The second case 101b and 102b may be rotated with respect to the first case 101a and 102a, to vary the curvature of the mobile terminal case.

As shown in FIG. 4 (b), the mobile terminal may include three or more cases including a first case 101a, 102a, a second case 101b and 102b and a third case 101c and 102c. Each of the cases may be rotatable to adjust an angle thereof, such that more specified curvature adjustment of the mobile terminal 100 can be possible.

Referring to FIGS. 2 and 3, the first case 101a and 102a may be smaller than the second case 101b and 102b. Alternatively, the first case 101a and 102a may be equal to or larger than the second case 101b and 102b. Each of the cases may have a level bar shape or a curved shape with a preset curvature shown in FIG. 4.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

Hereinafter, in one embodiment shown in FIGS. 2 and 3, a display unit 151, a first audio output unit 152a, a proximity sensor 141, a luminance sensor 142, an optical output unit 154 and a first camera 121a may be arranged in a front surface of the terminal body. A user input unit 123, a microphone 122 and an interface unit 160 may be arranged in a lateral surface of the terminal body. A second audio output unit 152b and a second camera 121b may be arranged in a rear surface of the terminal body.

However, it is to be understood that alternative arrangements are possible and within the teachings of the instant disclosure. Some components may be omitted or rearranged. For example, the first manipulation unit 123a may be located on front surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be formed of a flexible material to vary a curvature of the display unit 151 based on variation of angles of the first and second cases 101a and 102a and 101b and 102b. A typical example of the flexible display unit 151 may be an organic light-emitting diode (OLED).

The OLED refers to "Self light-emitting organic material" which emits light, using electroluminescence for emitting light when a current flows to fluorescence organic compounds. Such the OLED may be driven at a low voltage and it can be fabricated to have a slim shape. Also, the OLED has a wide viewing angle and a rapid response speed, such that no afterimage may remain in a screen. For a small screen, the OLED has advantageous price competitiveness because of its screen quality better than LCD and simple manufacturing process. Especially, the OLED is self-luminescent and it can then realize a thin flexibly-curved display unit 151, with no backlight unit.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). As the case may be, the touch screen may provide a button for the user to input a command and it can replace at least some of the functions of the user input unit 123.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The user input unit 123 configured of physical buttons receive an command input to control the operation of the mobile terminal 100 and it may be referenced to as "a manipulating portion". Any manners can be applied to the user input unit 123 only if they belong to tactile manner manipulated by the user with receiving a tactile feeling such as touch, push, scroll and so on. Alternatively, manners without the user's tactile feeling such as proximity touch, hovering touch and so on may be applied to the user input unit 123.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

Figure 5:
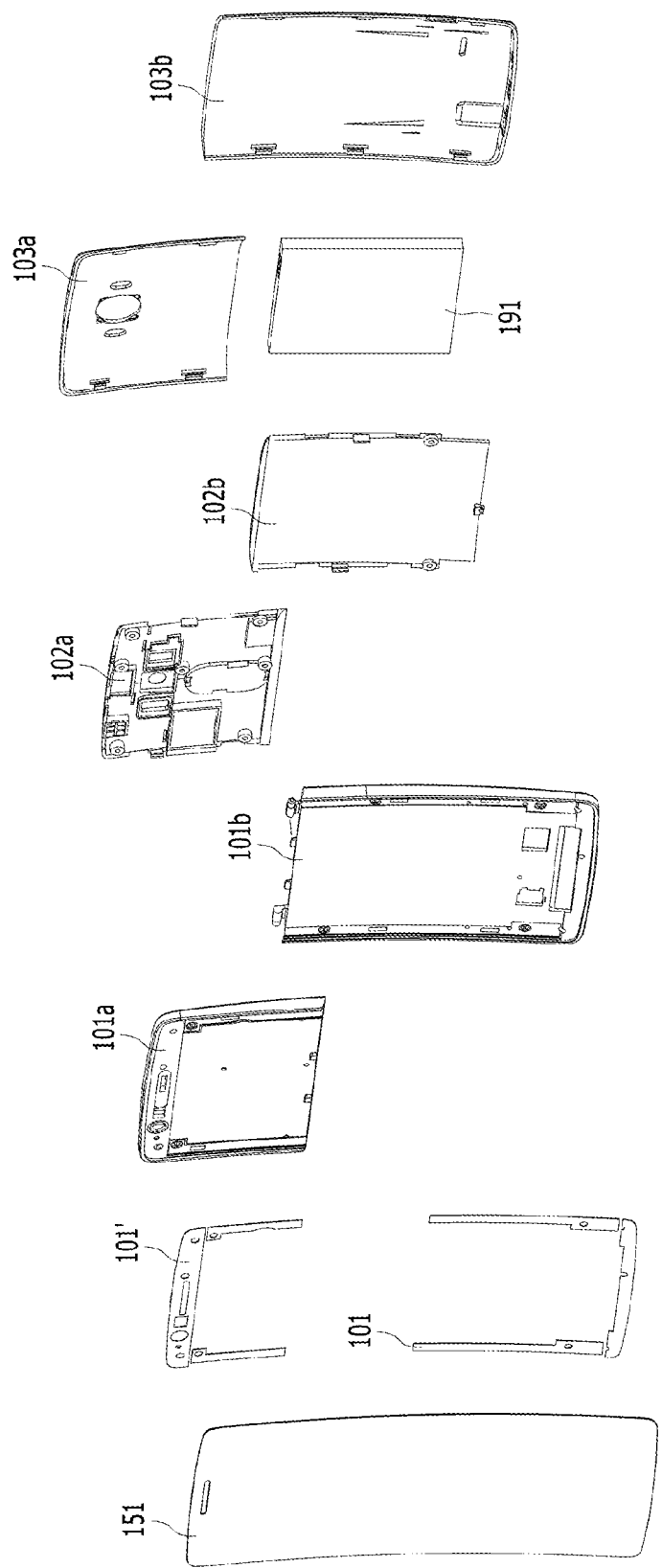
FIG. 5 is an exploded perspective diagram illustrating one embodiment of the mobile terminal in accordance with the present disclosure.

FIG. 5 is an exploded perspective diagram illustrating one embodiment of the mobile terminal in accordance with the present disclosure. The mobile terminal may consist of a display unit 151, a front case 101a and 101b, a rear case 102a and 102b, a battery 191 and a battery cover 103a and 103b. The other components except the display unit are divided into two parts and they may be divided into a first case 101a and 102a and a second case 101b and 102b.

This embodiment discloses the mobile terminal having a curved surface curved longitudinally, in other words, vertically. This embodiment may be applied to all of the mobile terminals having the case divided into two cases in a direction in which the curved surface is formed.

The first case 101a and 102b provided in a top portion may include a first front case 101a and a first rear case 102a. Electronic components may be provided on a first electric control unit arranged between the first front case 101a and the first rear case 102a.

The second case 101b and 102b provided in a lower portion may include a second case 101b and a second rear case 102b. Electronic components may be provided under a second electric control unit arranged between the front case 101b and the second rear case 102b.

In case of further including a rear cover for covering parts mounted in a rear surface of the rear case 102a and 102b (e.g., the battery), the rear cover may be divided into a first rear cover 103a and a second rear cover 103b (see FIG. 5).

A printed circuit board, a camera 121 and a receiver 152a may be provided in the first electric control unit. A battery 191 may be provided in the second electric control unit. Alternatively, an internal battery (not shown) may be provided in the first electric control unit and a battery 191 may be mounted in the rear surface of the second rear case 102b. After that, the rear cover is coupled to the second rear case 102b, only to use a replaceable battery and an internal battery simultaneously.

In case a replaceable component is mounted only in a rear surface of the first case 102a or the second rear case 102b of the rear case 102a and 102b, the rear case may be coupled only to one of the first rear case 102a and the second rear case 102b.

The front case 101 and 101b and the rear case 102b and 102b are coupled to each other via a coupling hook or screw provided in an outer portion. The front case 101a and 101b and the display unit may be coupled to each other, using a double-sided tape 101'. The tape may consist of a first double-sided tape bonded to the first front case 101a and a second double-sided tape bonded to the second front case 101a.

Figure 6:
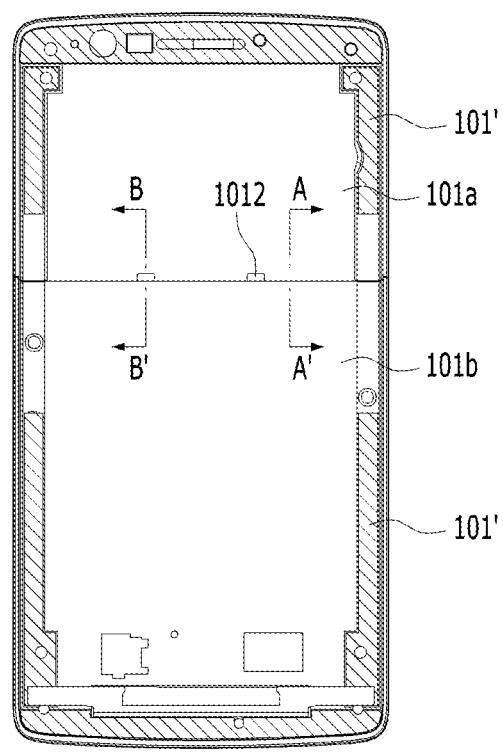
FIG. 6 is a front view illustrating one embodiment of a front case in accordance with the present disclosure.

FIG. 6 is a front view illustrating one embodiment of the front case 101a and 101b in accordance with the present disclosure. As shown in FIG. 6, the double-sided tape 101' may not be provided in a border area between the first front case 101a and the second front case 101b. In case the double-sided tape 101' is provided even to the border area between the first front case 101a and the second front case 101b, the display unit might be folded in the border area between the first front case 101a and the second front case 101b. Not double-sided tape may be provided in the border area between the first front case 101a and the second front case 101b, for the display 151 to be curved softly.

The first case 101a and 102a is hingedly coupled to the second case 101b and 102b. In this embodiment, a hinge shaft 1011 projected toward the first case 101a and 102a from the second case 101b and 102b is inserted in a hinge housing 1014 formed in the second case 101b and 102b, such that an angle formed by the first case 101a and 102a and the second case 101b and 102b can be varied.

The hinge shaft 1011 and the hinge housing 1014 in accordance with this embodiment may be provided in the first front case 101a and the second front case 101b composing the front case 101a and 101b, respectively. In other embodiments, the hinge shaft 1011 and the hinge housing 1014 may be provided in the rear case 102a and 102b.

Figure 7:
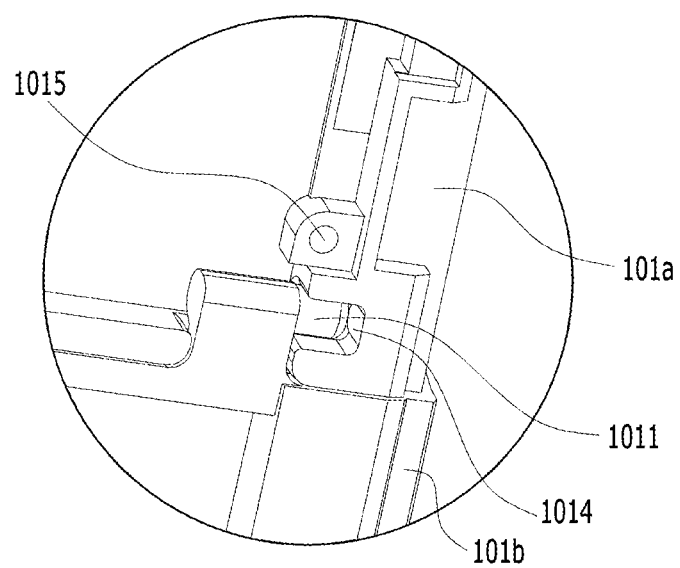
FIG. 7 is a perspective diagram illustrating one embodiment of a border area between a first front case and a second front case in accordance with the present disclosure.
Figure 8:
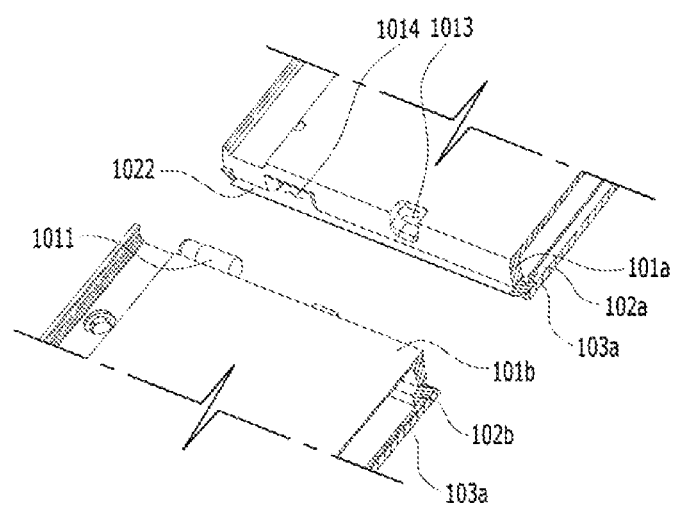
FIG. 8 is an exploded perspective diagram illustrating one embodiment of first and second cases in accordance with the present disclosure.
Figure 9:
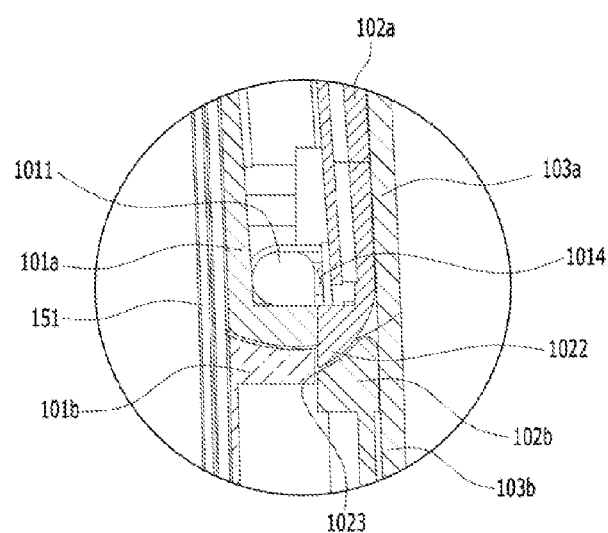
FIG. 9 is a diagram of A-A' line shown in FIG. 6.

FIG. 7 is a perspective diagram illustrating one embodiment of the border area between the first front case 101a and the second front case 101b in accordance with the present disclosure. FIG. 8 is an exploded perspective diagram illustrating one embodiment of the first and second cases 101a and 102a and 102a and 102b in accordance with the present disclosure. FIG. 9 is a diagram of A-A' line shown in FIG. 6.

The hinge shaft 1011 is extended from an extension projected from the second front case 101b toward the first case 101a and 102b in a direction in parallel with a coupling surface between the first case 101a and 102a and the second case 101b and 102b. The hinge shaft 10111 is disposed in the hinge housing 1014 provided in the case 101a and 102a to rotate in the first case 101a and 102a. The first front case 101a and the first rear case 102a are coupled to each other to surround the hinge shaft 1011, to form the hinge housing 1014.

The first front case 101a may be coupled to the first rear case 102 by a screw, to prevent them from getting widened apart. A boss 1015 is formed in the first front case 101a to insert the screw therein and a screw hole is formed in the second front case 101b to pass the screw there through.

A plurality of bosses 1015 and a plurality of screws may be formed along a circumference of the case. The portion where the screws are formed may not be get widened easily. However, when an external shock is applied, the screw and the screw hole partially get widely apart. Accordingly, the bosses 1015 shown in FIG. 7 may be formed adjacent to the hinge housing 1014 to prevent the hinge housing 1014 from getting widened enough to separate the hinge shaft 1011.

It is shown in the drawings that the hinge shaft 1011 and the hinge housing 1014 are provided in both ends of the case. However, they may be provided in a middle portion of the case. In case they are provided in the ends, the hinge shaft 1011 and the hinge housing 1014 may prevent the first case 101a and 102a and the second case 101b and 102b from getting spaced apart from the ends.

A stopper may be further provided to restrict a rotation angle between the first case 101a and 102a and the second case 101b and the 101b. Referring to FIG. 6, two stoppers are provided between a pair of the hinge shafts 1011 in this embodiment.

The stopper may prevent the angle formed by the first case 101a and 102a and the second case 101b and 101b from being varied enough to bend them a preset level or more. The stoppers may consist of a first stopper 1012 and 1013 for restricting a rotation angle toward the front surface to make the angle formed by the first case 101a and 102a and the second case 101b and the 102b be an acute angle and a second stopper 1022 and 1023 for restricting a rotation angle toward the rear surface to make the angle be an acute angle.

Figure 10:
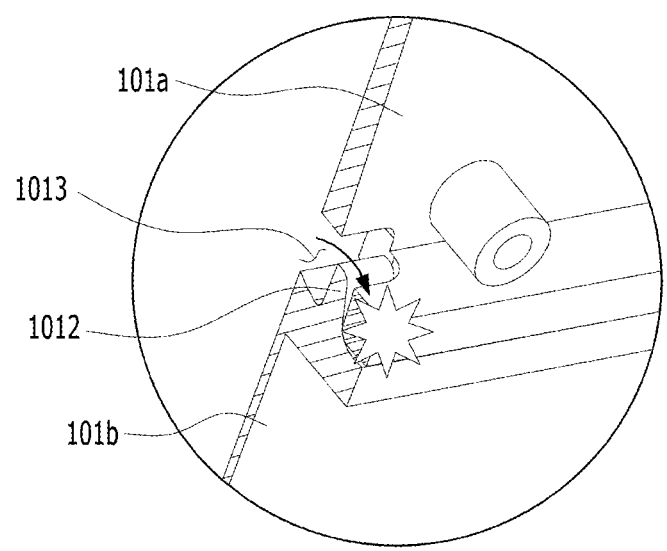
FIG. 10 is a diagram of B-B' line shown in FIG. 6.

FIG. 10 is a diagram illustrating B-B' shown in FIG. 6. The first stopper includes a stopping projection 1012 projected from the second front case 101b toward the first front case 101a and a first angle restricting groove 1013 formed in the front case 101a to insert the first stropping projection 1012 therein.

The first stopping projection 1012 is formed in a taper shape getting smaller than the first angle restricting groove 1013 toward an end. Accordingly, the angle formed by the first case 101a and 102a and the second case 101b and 102b can be varied in a rage of angles corresponding to an angle of an inclined surface provided in the first stopping projection 1012. If the first stopping projection 1012 and the first angle restricting groove 1013 are formed in the reverse direction, the rotation angle toward the rear surface can be restricted.

Referring to FIGS. 8 and 10, a front portion of the first angle restricting groove 1013 is open. However, when the front portion is blocked, an angle of the cases bent toward the rear surface can be restricted and the first stopper may perform the functions of the second stopper as well as the function thereof simultaneously.

The second stopper for restricting the angle of the cases bent toward the rear surface may include a second stopping projection 1022 projected from the first case 101a and 102a and a second angle restricting groove formed in the second case 101b and 102b.

The second angle restricting groove 1023 has a stepped portion and an inclined surface at a border surface of the second case 101b and 102b facing the first case 101a and 102a. The step of the second angle restricting groove 1023 is formed between the second rear case 102b and the second front case 101b and the inclined surface may be formed in the second rear case 102b (see FIG. 9). The second stopping projection 1022 projected from the first case 101a and 101b is stopped by the step of the second angle restricting groove 1023, to restrict the rotation angle toward the rear surface.

As shown in FIG. 9, the border surfaces of the first case 101a and 102a and the second case 101b and 102b facing each other may be a curved surface. The curved surface may be formed in an arc shape with respect to the hinge shaft 1011. The disadvantage of collision against the border surfaces when the angle formed between the first case 101a and 102a and the second case 101b and 102b is changed may be solved.

Figure 11:
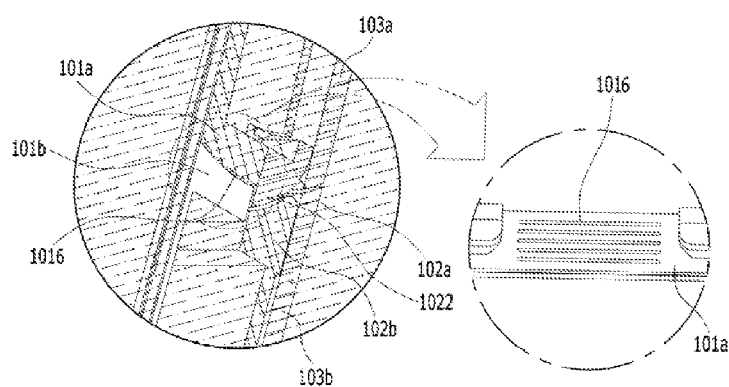
FIG. 11 is a sectional diagram illustrating another embodiment of the first and second cases in accordance with the present disclosure.

FIG. 11 is a sectional diagram illustrating another embodiment of the first and second cases 101a and 102a and 101b and 102b in accordance with the present disclosure. A material having a large friction coefficient may be disposed or a projection 1016 may be formed in at least one of the border surfaces of the first case 101a and 102a and the second case 101b and 102b. The angle formed by the first case 101a and 102a and the second case 101b and 102b may be changed only when the user applies a force. The angle may be restricted from changing based on the gravity or the movement of the mobile terminal even when the user applies no force.

Figure 12:
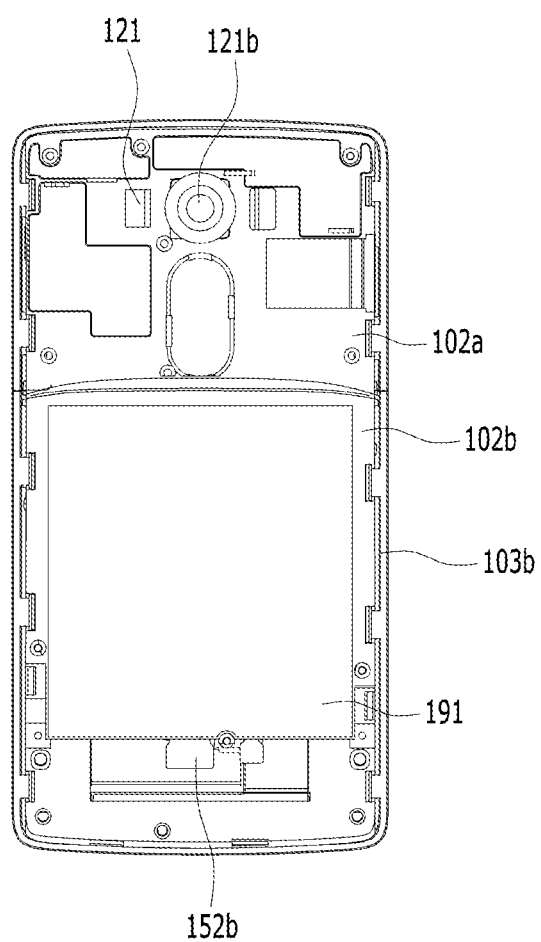
FIG. 12 is a rear view of a rear case in accordance with the present disclosure.

FIG. 12 is a rear view of a rear case in accordance with the present disclosure. Components including the printed circuit board, the camera 121 and the receiver 152a are mounted in the first case 101a and 102a. The battery may be mounted in the second case 101b and 102b. Alternatively, an external battery may be mounted in the second case 101b and 102b and an internal battery is mounted in the first case 101a and 102b. Accordingly, the mobile terminal 100 can be used even when the external battery is unloaded.

Figure 13:
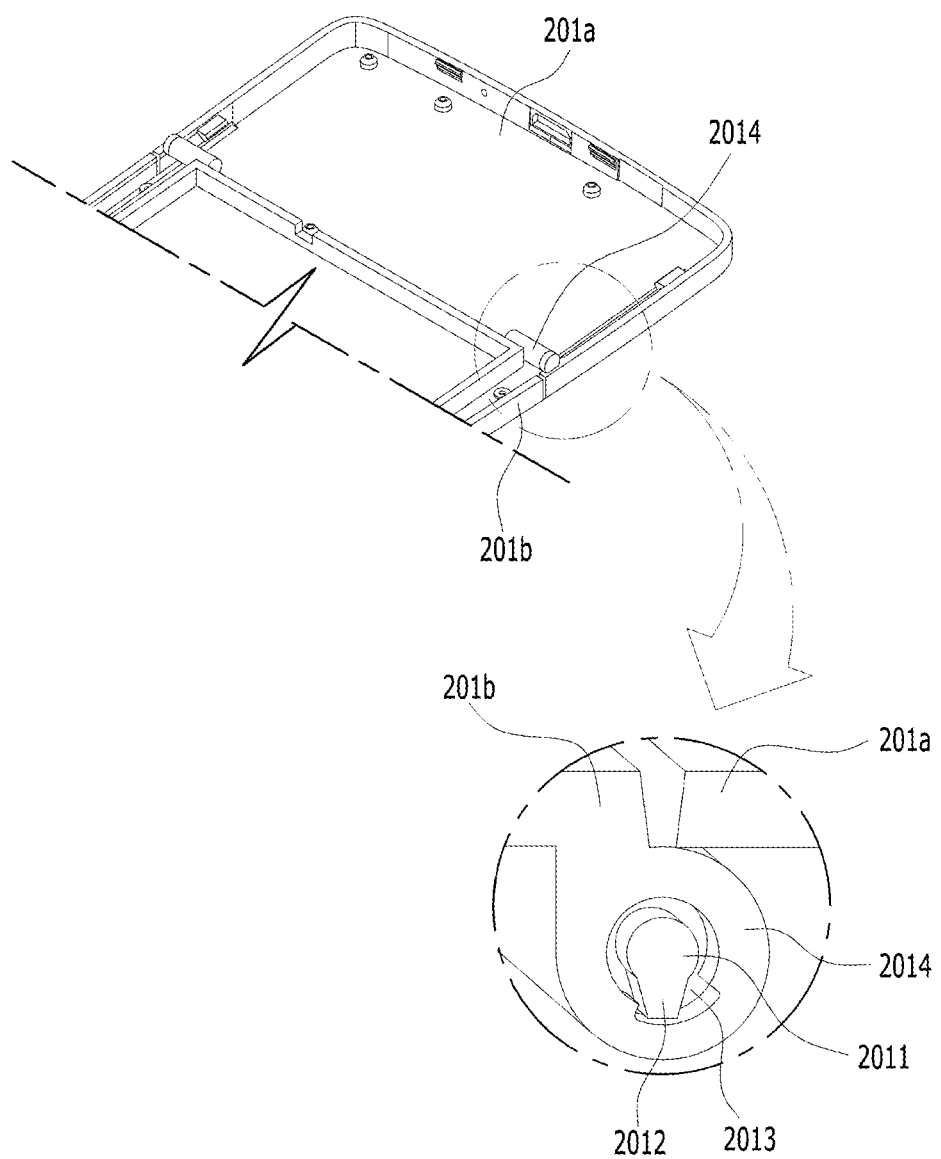
FIG. 13 is a rear perspective diagram illustrating another embodiment of the front case in accordance with the present disclosure.

FIG. 13 is a rear perspective diagram illustrating another embodiment of the front case in accordance with the present disclosure. In this embodiment, a stopper is realized in a hinge shaft 2011 and a hinge housing 2014. The stopper may include a stopping projection 2012 projected from an outer surface of the cylindrical-shaped hinge shaft 2011 disposed in the hinge housing 2014 and an angle restricting groove 2014 recessed from an inner surface of the hinge housing 2014 as far as the height or the larger depth of the stopping projection 2012, corresponding to the stopping projection 2012.

The width of the angle restricting groove 2013 is extended than the width of the stopping projection 2012, to have a fan shape shown in FIG. 13. The angle adjustment between the first case 101a and 102a and the second case 101b and 102b with respect to the hinge shaft 2011 may be enabled within a range of the fan angles of the angle restricting groove 2014.

Figure 14:
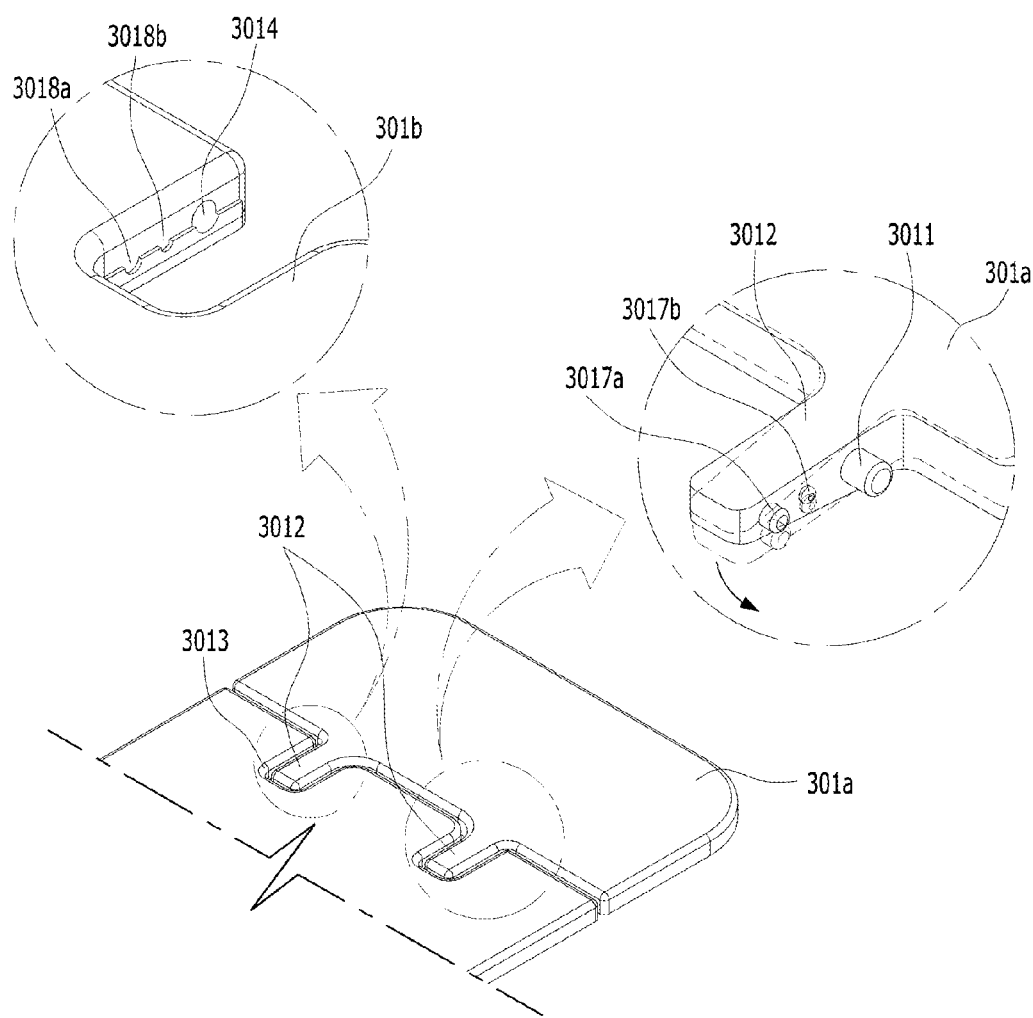
FIG. 14 is a front perspective diagram illustrating a further embodiment of the front case in accordance with the present disclosure.

FIG. 14 is a front perspective diagram illustrating a further embodiment of the front case in accordance with the present disclosure. as shown in FIG. 14, a stopping projection 3012 which will be described in this embodiment may be projected from a first front case 301a to be inserted in an angle restricting groove 3013 formed in the second front case 301b. The stopping projection 3012 may be formed in a taper shape (of which a cross section area is getting smaller toward an end). Accordingly, the first front case 301a may be relatively rotated with respect to the second front case 301b as much as an angle of an inclined surface formed in the stopping projection 3012.

The hinge shaft in accordance with the present disclosure is projected from a lateral surface of the stopping projection 3012 and the hinge housing 3014 is inserted in the angle restricting groove 3013. A guide projection 3017a and 3017b projected from a lateral surface of the stopping projection 3012 may be gradually stopped by the angle restricting groove 3013. Accordingly, when a force is applied additionally, the angle of the mobile terminal may be varied additionally and an operational sense may be provided to the user when the angle is adjusted.

In at least one embodiment of the present disclosure, the curvature of the mobile terminal may be variable and it is convenient to hand-carry the mobile terminal. In addition, the user can change the curvature he or she can feel comfortable. Even when a force is applied to an end of the mobile terminal, the damage on the mobile terminal can be prevented.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a case; and
   a flexible display unit to couple to the case;
   wherein the case includes:
   a first case;
   a second case to couple to the first case, and the second case to rotate with respect to the first case within a preset range of angles, wherein a border surface of the first case and a border surface of the second case face each other;
   a hinge shaft at the first case;
   a hinge housing at the second case, a portion of the hinge shaft to be provided in the hinge housing;
   a stopper to restrict a rotational angle between the first case and the second case,
   wherein the stopper includes:
   an angle restricting groove recessed from the border surface of the first case;
   a stopping projection to project from the border surface of the second case to the angle restricting groove, and at least a portion of the stopping projection to be provided at the angle restricting groove;
   a guide projection at a lateral surface of the stopping projection; and
   a guide groove at a lateral surface of the angle restricting groove provided at the second case, a portion of the guide projection to be provided at the guide groove,
   the stopping projection includes a taper-shaped stopping projection getting smaller than the angle restricting groove,
   wherein a plurality of guide projections and a plurality of guide grooves are provided along a longitudinal direction of the case, and
   the guide projections are stopped by an end of the guide groove.

2. The mobile terminal of claim 1, wherein the stopper includes:
   a first stopper to restrict a rotational angle toward a first surface; and
   a second stopper to restrict a rotational angle toward a second surface.

3. The mobile terminal of claim 1, wherein a border surface between the first case and the second case comprises includes a curved surface with respect to the hinge shaft.

4. The mobile terminal of claim 3, wherein the border surface has a projection or is formed of a material having a large friction coefficient.

5. The mobile terminal of claim 1, wherein the first case includes:
   a first front case at a rear surface of the display unit;
   a first rear case to couple to a rear surface of the first front case; and
   an attachment device to couple the first front case to the second front case, and
   the hinge housing to couple the first front case to the first rear case, and
   the attachment device to couple to a portion adjacent to the hinge housing.

6. The mobile terminal of claim 1, further comprising:
   a first tape to attach the first case to the display unit; and
   a second tape to attach the second case to the display,
   wherein the second tape is spaced apart by a preset distance from a border area between the first case and the second case.

7. The mobile terminal of claim 1, further comprising:
   a third case to rotatably couple to the second case,
   wherein the first case to couple to a first portion of the second case, and the third case to couple to a second portion of the second case.

8. The mobile terminal of claim 1, wherein a main board is provided in the first case, and a battery is provided in the second case.

9. The mobile terminal of claim 8, wherein a connection hole is formed in the first case and the second case, and
   a flexible board to couple the main board to the battery through the connection hole.

10. The mobile terminal of claim 1, wherein the flexible display unit is an organic light emitting diode (OLED).

11. A mobile terminal comprising:
    a first case;
    a second case to couple to the first case, and the second case to rotate with respect to the first case, wherein a border surface of the first case and a border surface of the second case face each other;
    a hinge shaft at the first case, the hinge shaft having a cylindrical shape;
    a hinge housing at the second case, a portion of the hinge shaft to be provided in the hinge housing; and
    a stopper to restrict rotational of the first case relative to the second case,
    wherein the stopper includes an angle restricting groove recessed from the border surface of the first case and a stopping projection to project from the border surface of the second case to the angle restricting groove, and at least a portion of the stopping projection to be provided at the angle restricting groove,
    wherein the angle restricting groove has a step portion stepped from the border surface of the second case and an inclined surface formed at an opposite portion of the step portion, and
    wherein the stopping projection moves along the inclined surface and is stopped by the step portion to restrict a rotational angle of the first case relative to the second case.

* * * * *